US011022869B2

(12) United States Patent
Sakata et al.

(10) Patent No.: US 11,022,869 B2
(45) Date of Patent: Jun. 1, 2021

(54) LIGHT SOURCE APPARATUS AND PROJECTOR

(71) Applicant: SEIKO EPSON CORPORATION, Tokyo (JP)

(72) Inventors: Hidefumi Sakata, Tatsuno-machi (JP); Junichi Suzuki, Matsumoto (JP); Shingo Komiyama, Chino (JP); Yuichiro Iwama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/690,537

(22) Filed: Nov. 21, 2019

(65) Prior Publication Data

US 2020/0166828 A1    May 28, 2020

(30) Foreign Application Priority Data

Nov. 22, 2018  (JP) .............................. JP2018-219522

(51) Int. Cl.
*G03B 21/20* (2006.01)
*F21V 8/00* (2006.01)
*F21Y 115/30* (2016.01)

(52) U.S. Cl.
CPC .......... *G03B 21/204* (2013.01); *G02B 6/0006* (2013.01); *G02B 6/0008* (2013.01); *G03B 21/2013* (2013.01); *F21Y 2115/30* (2016.08)

(58) Field of Classification Search
CPC ....... F21V 9/20; G02B 6/0006; G02B 6/0008; G03B 21/2013; G03B 21/204
See application file for complete search history.

(56) References Cited

U.S. PATENT DOCUMENTS

| 2007/0189352 | A1 | 8/2007 | Nagahama et al. |
| 2007/0279914 | A1* | 12/2007 | Rutherford .......... G03B 21/204 362/341 |
| 2009/0078949 | A1* | 3/2009 | Bechtel ................ G02B 6/0003 257/98 |
| 2014/0268063 | A1* | 9/2014 | Akiyama ............. G03B 21/204 353/20 |

(Continued)

FOREIGN PATENT DOCUMENTS

| JP | 2012-150212 A | 8/2012 |
| JP | 2016-531381 A | 10/2016 |

(Continued)

*Primary Examiner* — Zheng Song
(74) *Attorney, Agent, or Firm* — Oliff PLC

(57) ABSTRACT

A light source apparatus according to an aspect of the present disclosure includes a first light source that emits first light, a second light source that emits second light, a light guide that causes the first light emitted from the first light source to propagate, a wavelength converter containing a phosphor that emits fluorescence when excited with the second light emitted from the second light source, and a light combiner that combines the first light having exited out of the light guide with the fluorescence having exited out of the wavelength converter. The light guide and the wavelength converter are disposed side by side. The light guide has a first end section and a second end section. The wavelength converter has a third end section and a fourth end section. The first light enters the light guide via the first end section thereof.

14 Claims, 6 Drawing Sheets

(56) References Cited

U.S. PATENT DOCUMENTS

| | | | |
|---|---|---|---|
| 2016/0131813 A1* | 5/2016 | Hikmet | G02B 6/0041 |
| | | | 362/611 |
| 2016/0147135 A1* | 5/2016 | Cheng | G03B 21/204 |
| | | | 353/31 |
| 2016/0266297 A1* | 9/2016 | Hikmet | G02B 6/0075 |
| 2016/0377785 A1* | 12/2016 | Chestakov | F21S 43/14 |
| | | | 362/606 |
| 2017/0139113 A1* | 5/2017 | Peeters | F21S 41/147 |
| 2017/0315433 A1* | 11/2017 | Ronda | G03B 21/2013 |
| 2018/0363858 A1* | 12/2018 | Peeters | G02B 6/00 |
| 2020/0026169 A1* | 1/2020 | Chang | H04N 9/3114 |
| 2020/0041885 A1* | 2/2020 | Peeters | F21S 41/151 |
| 2020/0096850 A1 | 3/2020 | Kato et al. | |
| 2020/0241190 A1* | 7/2020 | Ivanova | G02B 6/0003 |

FOREIGN PATENT DOCUMENTS

| | | |
|---|---|---|
| JP | 2016-537770 A | 12/2016 |
| JP | 2017-009981 A | 1/2017 |
| JP | 2017-536664 A | 12/2017 |
| WO | 2006/054203 A1 | 5/2006 |
| WO | 2008/078820 A1 | 7/2008 |
| WO | 2014/198619 A1 | 12/2014 |
| WO | 2015/058979 A1 | 4/2015 |
| WO | 2016/075014 A1 | 5/2016 |
| WO | 2017/097762 A1 | 6/2017 |
| WO | 2018/173284 A1 | 9/2018 |
| WO | WO2018/173284 A1 | 9/2018 |

\* cited by examiner

LIGHT SOURCE APPARATUS AND PROJECTOR

The present application is based on, and claims priority from JP Application Serial Number 2018-219522, filed Nov. 22, 2018, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light emitted from a light emitting device. JP-T-2017-536664 discloses an illuminator including a rod-shaped ceramic element providing a wavelength conversion effect and a light emitting diode (LED) that emits excitation light and so configured that the excitation light is caused to enter the ceramic element via a side surface thereof and the resultant converted light is extracted via an end surface of the ceramic element.

As described in JP-T-2017-536664, causing the light emitted from the LED to enter the wavelength conversion member allows generation of light having a wavelength different from the wavelength of the light emitted from the LED. For example, in a case where the wavelength conversion member contains a yellow phosphor, yellow light can be generated from blue light emitted from the LED. To generate white light necessary for a light source apparatus for a projector, however, a light source that emits the blue light, a light combining element that combines the blue light and the yellow light with each other, and other optical systems need to be separately provided in addition to the illuminator disclosed in JP-T-2017-536664. As a result, there is a problem of an increase in the size of the light source apparatus. Further, generating color light other than white light also requires an optical system for combining the fluorescence with light having another color and has the problem of an increase in the size of the light source apparatus.

SUMMARY

A light source apparatus according to an aspect of the present disclosure includes a first light source that emits first light, a second light source that emits second light, a light guide that causes the first light emitted from the first light source to propagate, a wavelength converter containing a phosphor that emits fluorescence when excited with the second light emitted from the second light source, and a light combiner that combines the first light having exited out of the light guide with the fluorescence having exited out of the wavelength converter. The light guide and the wavelength converter are disposed side by side. The light guide has a first end section and a second end section. The wavelength converter has a third end section and a fourth end section. The first light enters the light guide via the first end section thereof.

In the light source apparatus according to the aspect of the present disclosure, a lengthwise direction of the light guide may be a direction in which the first end section and the second end section face each other, a lengthwise direction of the wavelength converter may be a direction in which the third end section and the fourth end section face each other, and the light guide and the wavelength converter may be so disposed as to be adjacent to each other that the lengthwise direction of the light guide is parallel to the lengthwise direction of the wavelength converter.

In the light source apparatus according to the aspect of the present disclosure, the first light source may be a laser light source, and the second light source may be a light emitting diode light source.

In the light source apparatus according to the aspect of the present disclosure, the first light may be blue laser light emitted from the laser light source, the second light may be excitation light emitted from the light emitting diode light source, the fluorescence may be yellow fluorescence, and the light combiner may combine the blue laser light with the yellow fluorescence and output resultant white light.

In the light source apparatus according to the aspect of the present disclosure, the light guide may be provided at the first end section and may include a divergence angle adjuster that adjusts a divergence angle of the first light that enters the light guide.

The light source apparatus according to the aspect of the present disclosure may further include a divergence angle adjusting member that is provided between the first end section and the first light source and includes a divergence angle adjuster that adjusts a divergence angle of the first light that enters the light guide.

In the light source apparatus according to the aspect of the present disclosure, the divergence angle adjuster may be formed of any of a protruding/recessed structural element, a lens structural element, a prism structural element, and a filler dispersed layer.

In the light source apparatus according to the aspect of the present disclosure, the first light source may output the first light toward an end surface of the light guide.

In the light source apparatus according to the aspect of the present disclosure, the first light source may output the first light toward a side surface of the first end section of the light guide.

In the light source apparatus according to the aspect of the present disclosure, the light combiner may be disposed in a position where the light combiner faces the second end section and the fourth end section.

In the light source apparatus according to the aspect of the present disclosure, the light combiner may include a prism that faces the second end section and a dichroic prism that faces the fourth end section.

Alight source apparatus according to another aspect of the present disclosure includes a laser light source that emits blue laser light, a light emitting diode light source that emits excitation light, a light guide that causes the blue laser light emitted from the laser light source to propagate, a wavelength converter that the excitation light emitted from the light emitting diode light source enters and contains a phosphor that emits yellow fluorescence when excited with the excitation light having entered the wavelength converter, and a light combiner that combines the blue laser light having exited out of the light guide with the yellow fluorescence having exited out of the wavelength converter and emits resultant white light, and the light guide and the wavelength converter are disposed side by side.

A projector according to another aspect of the present disclosure includes the light source apparatus according to the aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 and 2.

A projector according to the present embodiment is an example of a liquid crystal projector using a liquid crystal panel as a light modulator.

In the following drawings, components are drawn at different dimensional scales in some cases for clarity of each of the components.

Figure 1:
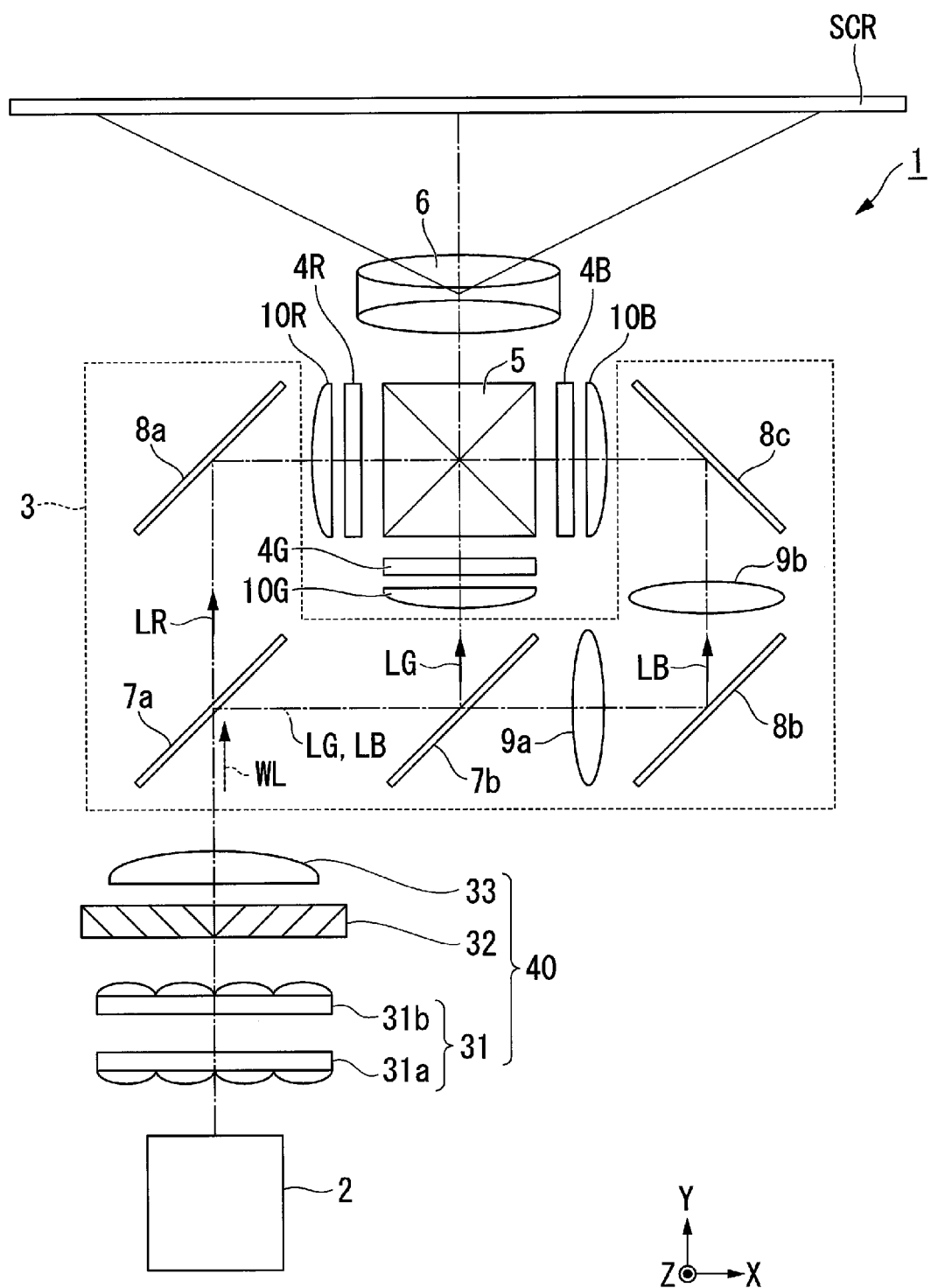
FIG. 1 is a schematic configuration diagram of a projector according to a first embodiment.

FIG. 1 is a schematic configuration diagram of a projector 1 according to the first embodiment.

The projector 1 according to the first embodiment is a projection-type image display apparatus that projects a color image on a screen (projection receiving surface) SCR. The projector 1 uses three light modulators corresponding to color light formed of red light LR, green light LG, and blue light LB.

The projector 1 includes a light source apparatus 2, a uniform illumination system 40, a color separation system 3, a light modulator 4R, a light modulator 4G, a light modulator 4B, a light combining system 5, and a projection optical apparatus 6, as shown in FIG. 1.

The light source apparatus 2 emits illumination light WL toward the uniform illumination system 40. A detailed configuration of the light source apparatus 2 will be described later in detail.

The uniform illumination system 40 includes an optical integration system 31, a polarization converter 32, and a superimposing system 33. The optical integration system 31 includes a first lens array 31a and a second lens array 31b. The uniform illumination system 40 homogenizes the intensity distribution of the illumination light WL, which is emitted from the light source apparatus 2, on each of the light modulators 4R, 4G, and 4B, which are each a region to be illuminated. The illumination light WL having exited out of the uniform illumination system 40 enters the color separation system 3.

The color separation system 3 separates the illumination light WL, which is white light, into the red light LR, the green light LG, and the blue light LB. The color separation system 3 includes a first dichroic mirror 7a, a second dichroic mirror 7b, a first reflection mirror 8a, a second reflection mirror 8b, a third reflection mirror 8c, a first relay lens 9a and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light (green light LG and blue light LB). On the other hand, the second dichroic mirror 7b separates the other light into the green light LG and the blue light LB. The second dichroic mirror 7b reflects the separated green light LG and transmits the blue light LB.

The first reflection mirror 8a is disposed in the optical path of the red light LR and reflects the red light LR having passed through the first dichroic mirror 7a toward the light modulator 4R. On the other hand, the second reflection mirror 8b and the third reflection mirror 8c are disposed in the optical path of the blue light LB and reflect the blue light LB having passed through the second dichroic mirror 7b toward the light modulator 4B. The green light LG is reflected off the second dichroic mirror 7b toward the light modulator 4G.

The first relay lens 9a and the second relay lens 9b are disposed in the optical path of the blue light LB on the light exiting side of the second dichroic mirror 7b. The first relay lens 9a and the second relay lens 9b correct the difference in illumination distribution of the blue light LB resulting from the fact that the optical path of the blue light LB is longer than the optical paths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each formed, for example, of a transmissive liquid crystal panel. Polarizers (not shown) are disposed on the light incident side and the light exiting side of each of the liquid crystal panels and each transmit only light linearly polarized in a specific direction.

Field lenses 10R, 10G, and 10B are disposed on the light incident side of the light modulators 4R, 4G, and 4B, respectively. The field lenses 10R, 10G, and 10B parallelize the principal beams of the red light LR, the green light LG, and the blue light LB to be incident on the light modulators 4R, 4G, and 4B, respectively.

The light combining system 5, on which the image light emitted from each of the light modulators 4R, 4G, and 4B is incident, combines the image light corresponding to the red light LR, the image light corresponding to the green light LG, and the image light corresponding to the blue light LB with one another, and causes the combined image light to exit toward the projection optical apparatus 6. The light combining system 5 is formed, for example, of a cross dichroic prism.

The projection optical apparatus 6 is formed of a plurality of projection lenses. The projection optical apparatus 6 enlarges the combined image light from the light combining systems 5 and projects the enlarged image light toward the screen SCR. An image is thus displayed on the screen SCR.

The light source apparatus 2 will be described below.

Figure 2:
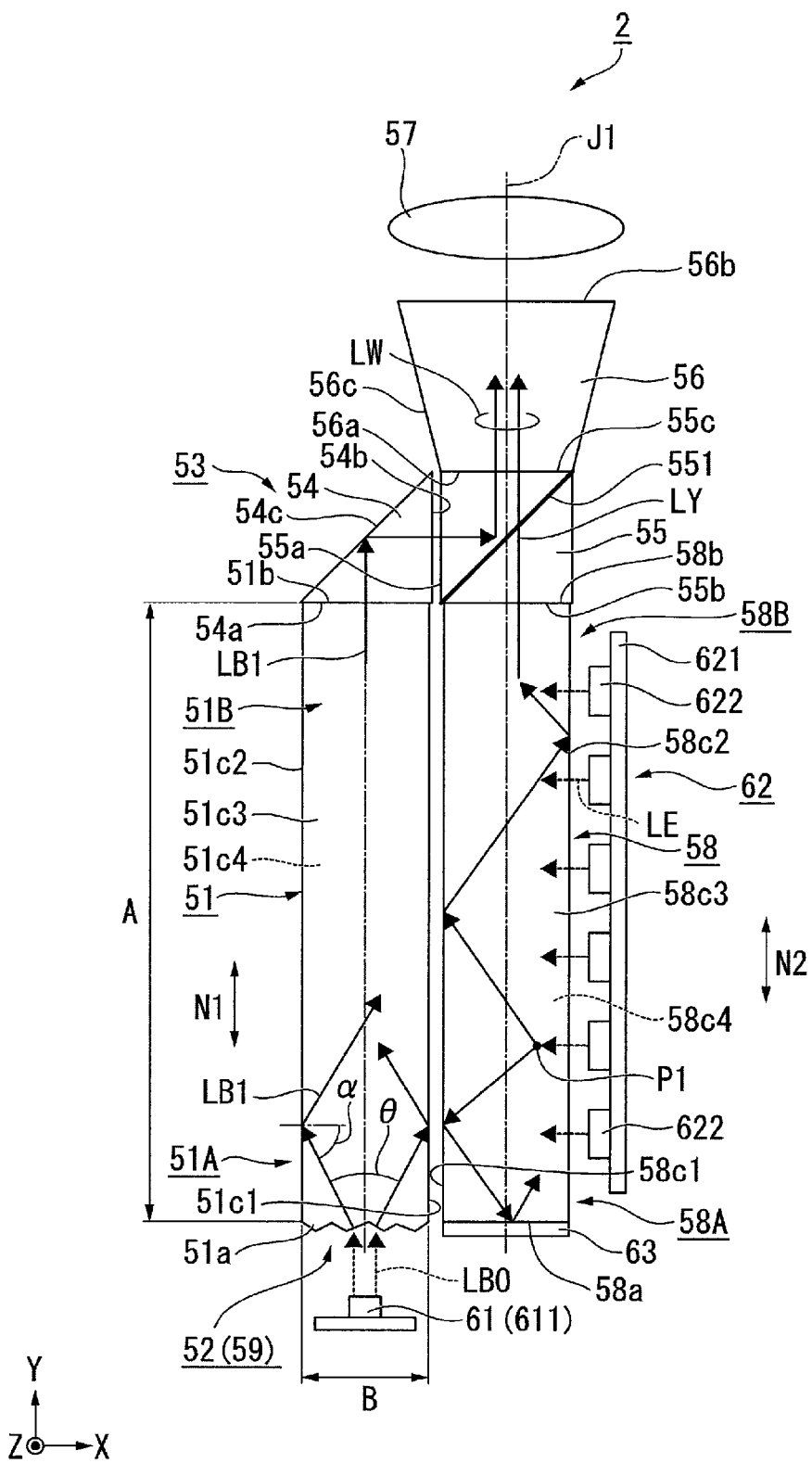
FIG. 2 is a side view of a light source apparatus according to the first embodiment.

FIG. 2 is a schematic configuration diagram of the light source apparatus 2.

The light source apparatus 2 includes a light guiding rod 51 (light guide), a wavelength conversion rod 58 (wavelength converter), a first light source 61, a second light source 62, a light combiner 53, an angle converter 56, and a collimator lens 57, as shown in FIG. 2.

The light guiding rod 51 has a quadrangular columnar shape having six surfaces and has a first end section 51A and a second end section 51B, which face each other. The six surfaces have a first end surface 51a and a second end surface 51b, which face each other, and four side surfaces 51c1, 51c2, 51c3, and 51c4, which intersect the first end surface 51a and the second end surface 51b. In the present specification, the direction in which the first end section 51A and the second end section 51B face each other is defined as a lengthwise direction N1 of the light guiding rod 51.

Similarly, the wavelength conversion rod 58 has a quadrangular columnar shape having six surfaces and has a third end section 58A and a fourth end section 58B, which face each other. The six surfaces have a third end surface 58a and a fourth end surface 58b, which face each other, and four side surfaces 58c1, 58c2, 58c3, and 58c4, which intersect the third end surface 58a and the fourth end surface 58b. An axis passing through the center of the third end surface 58a and the center of the fourth end surface 58b of the wavelength conversion rod 58 is defined as an optical axis J1 of the light source apparatus 2. The light from the light source apparatus 2 exits along the optical axis J1. In the present specification, the direction in which the third end section 58A and the fourth end section 58B face each other is defined as a lengthwise direction N2 of the wavelength conversion rod 58.

In the present embodiment, the light guiding rod 51 and the wavelength conversion rod 58 have substantially the same dimensions. The dimension A of the light guiding rod 51 in the lengthwise direction N1 is greater than the dimension B of the light guiding rod 51 in the widthwise direction thereof (direction perpendicular to lengthwise direction N1). For example, the dimension A is greater than the dimension B by a factor of about ten to several dozens. The wavelength conversion rod 58 is configured in the same manner as is the light guiding rod 51.

The light guiding rod 51 and the wavelength conversion rod 58 do not each necessarily have a quadrangular columnar shape and may each instead have a triangular columnar shape or any other polygonal columnar shape. The light guiding rod 51 and the wavelength conversion rod 58 may each still instead have a cylindrical shape. In the case where the light guiding rod 51 and the wavelength conversion rod 58 each have a cylindrical shape, the light guiding rod 51 and the wavelength conversion rod 58 each have a first end surface and a second end surface parallel to each other and one side surface perpendicular to the first end surface and the second end surface.

The light guiding rod 51 and the wavelength conversion rod 58 are so disposed side by side with a gap therebetween that the side surface 51c1 of the light guiding rod 51 faces the side surface 58c1 of the wavelength conversion rod 58. In the present embodiment, the light guiding rod 51 and the wavelength conversion rod 58 are so disposed that the two rods are adjacent to each other and the lengthwise direction N1 of the light guiding rod 51 is parallel to the lengthwise direction N2 of the wavelength conversion rod 58. The arrangement described above allows a decrease in the width (dimension in direction perpendicular to optical axis J1) of the light source apparatus 2. The lengthwise direction N1 of the light guiding rod 51 and the lengthwise direction N2 of the wavelength conversion rod 58 are not necessarily parallel to each other and may deviate from the parallelism and incline with each other.

In the following description, the end surface via which the light enters the light guiding rod 51 is referred to as the first end surface 51a, and the end surface which faces the first end surface 51a and via which the light exits out of the light guiding rod 51 is referred to as the second end surface 51b for ease of description. An end surface of the wavelength conversion rod 58 that is the end surface on the same side of the first end surface 51a is referred to as the third end surface 58a, and the end surface which faces the third end surface 58a and via which the light exits out of the wavelength conversion rod 58 is referred to as the fourth end surface 58a.

The first light source 61 is so provided as to face the first end surface 51a of the light guiding rod 51. The first light source 61 is formed of a laser light source 611, which emits blue laser light LB0 (first light). The laser light LB0 emitted from the laser light source 611 belongs to a blue wavelength band, for example, from 400 to 480 nm and has a peak wavelength of, for example, 445 nm. The first light source 61 therefore emits the blue laser light LB0 toward the first end surface 51a of the light guiding rod 51. The laser light LB0 enters the light guiding rod 51 via the first end section 51A thereof.

The laser light source 611 is formed, for example, of a CAN-package-type laser light source that accommodates a collimator lens. The laser light source 611 therefore emits highly parallelized laser light. In the present embodiment, the first light source 61 is formed of one laser light source 611 but may instead be formed of a plurality of laser light sources 611, that is, the number of laser light sources 611 is not limited to a specific number.

The second light source 62 includes a substrate 621 and a plurality of light emitting diode light sources 622 (LED light sources), which each output excitation light LE (second light). The plurality of LED light sources 622 are mounted on one surface of the substrate 621 that is the surface facing the side surface 58c2 of the wavelength conversion rod 58. In the present embodiment, the second light source 62 includes six LED light sources 622, but the number of LED light sources 622 is not limited to a specific number. The excitation light LE emitted from each of the LED light sources 622 belongs to a blue wavelength band, for example, from 400 to 480 nm and has a peak wavelength of, for example, 445 nm. The second light source 62 therefore emits the excitation light LE toward the side surface 58c2 of the wavelength conversion rod 58.

The laser light LB0 emitted from the first light source 61 propagates through the interior of the light guiding rod 51, then exits out of the light guiding rod 51, and functions as blue light LB1, which forms part of the illumination light. On the other hand, the excitation light LE emitted from the second light source 62 enters the wavelength conversion rod 58 and then functions as excitation light that excites a phosphor in the wavelength conversion rod 58. As described above, since the function of the laser light LB0 emitted from the first light source 61 and the function of the excitation light LE emitted from the second light source 62 differ from each other, the first light source 61 and the second light source 62 may each output light having a wavelength optimized as the blue light or the excitation light and different from the wavelength of the light from the other light source or may output light having the same wavelength commonly used to achieve the two functions.

The light guiding rod 51 is made of a light transmissive material, for example, glass. The light LB0 emitted from the first light source 61 enters the light guiding rod 51, which causes the laser light LB0 having entered the light guiding rod 51 to propagate through the interior thereof. The light guiding rod 51 includes a divergence angle adjuster 52, which is provided at the first end surface 51a of the first end section 51A. The divergence angle adjuster 52 is formed of a protruding/recessed structural element 59 having a plurality of protrusions or recesses. The protrusions or recesses each have, for example, a pyramidal shape or a conical shape. The plurality of protrusions or recesses may be arranged at random intervals and may have random heights, shapes, and other factors. The divergence angle adjuster 52 has a configuration in which the protruding/recessed structural element 59 is formed directly at the first end surface 51a of the light guiding rod 51. That is, the divergence angle adjuster 52 is provided integrally with the light guiding rod 51. On the other hand, the side surfaces 51c1, 51c2, 51c3, and 51c4 of the light guiding rod 51 are each formed of a smooth surfaces.

For example, in a case where the first light source 61 includes a built-in collimator lens, the laser light LB0 emitted from the first light source 61 is substantially parallelized light having a divergence angle nearly equal to 0°. In a case where the substantially parallelized laser light LB0 directly enters the light guiding rod 51, the laser light LB0 is hardly reflected off the side surface 51c1, 51c2, 51c3, or 51c4 but propagates through the interior of the light guiding rod 51. In this case, the light guiding rod 51 provides no illuminance homogenizing effect.

In contrast, in the present embodiment, in which the divergence angle adjuster 52 is provided at the first end surface 51a of the light guiding rod 51, the divergence angle of the laser light LB0 increases from about 0° immediately after the laser light LB0 is emitted from the first light source 61 to an angle $\theta$. In this case, the divergence angle $\theta$ can be adjusted by optimizing the interval between the plurality of protrusions or recesses and the height, shape, and other factors thereof. As a result, the illuminance of the blue light LB1 is homogenized because the blue light LB1 propagates through the interior of the light guiding rod 51 while repeatedly reflected off the side surfaces 51c1, 51c2, 51c3, and 51c4. The divergence angle adjuster 52 thus adjusts the divergence angle $\theta$ of the laser light LB0 having entered the light guiding rod 51.

The wavelength conversion rod 58 contains a phosphor that emits fluorescence LY when excited with the excitation light LE emitted from the second light source 62. In the present embodiment, the phosphor is formed of a ceramic phosphor (polycrystal phosphor). The wavelength band of the fluorescence is, for example, a yellow wavelength band ranging from 490 to 750 nm. That is, the phosphor emits yellow fluorescence LY. The wavelength conversion rod 58 may be formed of a single-crystal phosphor in place of a polycrystal phosphor. The wavelength conversion rod 58 may instead be made of fluorescent glass. The wavelength conversion rod 58 may still instead be made of a glass or resin binder in which a large number of phosphor particles are dispersed.

Specifically, the wavelength conversion rod 58 is formed, for example, of an yttrium-aluminum-garnet-based (YAG-based) phosphor. Consider YAG:Ce, which contains cerium (Ce) as an activator, by way of example, and the wavelength conversion rod 58 can be made, for example, of a material produced by mixing raw material powder containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The wavelength conversion rod 58 includes a mirror 63 provided at the third end surface 58a of the wavelength conversion rod 58. The mirror 63 is formed of a metal film or a dielectric multilayer film.

The light combiner 53 is disposed in a position where the light combiner 53 faces the second end section 51B of the light guiding rod 51 and the fourth end section 58B of the wavelength conversion rod 58. The light combiner 53 combines the blue light LB1 having exited out of the light guiding rod 51 with the fluorescence LY having exited out of the wavelength conversion rod 58. The light combiner 53 includes a prism 54, which faces the second end section 51B of the light guiding rod 51, and a dichroic prism 55, which faces the fourth end section 58B of the wavelength conversion rod 58.

The prism 54 is so provided as to be in contact with the second end surface 51b of the light guiding rod 51. The prism 54 is formed of a triangular columnar prism having a right-angled isosceles triangular cross section and has a light incident end surface 54a, a reflection surface 54c, and a light exiting end surface 54b. The prism 54 has the function of deflecting the optical path of the incident light LB1 by 90° and causing the deflected light LB1 to exit. That is, the prism 54 causes the light LB1 having exited via the second end surface 51b of the light guiding rod 51 to be reflected off the reflection surface 54c to deflect the optical path of the light LB1 and causes the reflected light LB1 to exit via the light exiting end surface 54b.

The dichroic prism 55 is so provided as to face the fourth end surface 58b of the wavelength conversion rod 58 and the light exiting end surface 54b of the prism 54. The dichroic prism 55 has a configuration in which a dichroic mirror 551 is provided in the prism main body. The dichroic prism 55 has a cubic shape and has a light incident end surface 55a, a light incident end surface 55b, and a light exiting end surface 55c. The dichroic mirror 551 is characterized in that it reflects light that belong to the blue wavelength band and transmits light that belong to the yellow wavelength band. The blue light LB1 having exited out of the prism 54 is therefore reflected off the dichroic mirror 551 and travels toward the light exiting end surface 55c. On the other hand, the fluorescence LY having exited via the fourth end surface 58b of the wavelength conversion rod 58 passes through the dichroic mirror 551 and travels toward the light exiting end surface 55c.

The dichroic prism 55 thus combines the blue light LB1 having exited via the second end surface 51b of the light guiding rod 51 and the yellow fluorescence LY having exited via the fourth end surface 58b of the wavelength conversion rod 58. White combined light LW formed of the blue light LB1 and the yellow fluorescence LY then exits out of the dichroic prism 55. The blue light LB1 and the yellow fluorescence LY are thus combined with each other in the light combiner 53 as described above, whereby white light exits out of the light combiner 53.

The angle converter 56 is provided on the light exiting side of the light exiting end surface 55c of the dichroic prism 55. The angle converter 56 is formed of a tapered rod having a light incident end surface 56a, on which the combined light LW is incident, and a light exiting end surface 56b, via which the combined light LW exits. The angle converter 56 has a truncated pyramidal shape, with the cross-sectional area thereof perpendicular to the optical axis J1 increasing with distance along the traveling direction of the combined light LW, and the area of the light exiting end surface 56b is therefore greater than the area of the light incident end surface 56a. The thus shaped angle converter 56 angularly changes the traveling direction of the combined light LW, while the combined light LW travels through the interior of the angle converter 56, to the direction parallel to the optical axis J1 each time the combined light LW is totally reflected off a side surface 56c. The angle converter 56 thus causes the diffusion angle of the combined light LW at the light exiting end surface 56b to be smaller than the diffusion angle of the combined light LW at the light incident end surface 56a.

The angle converter 56 is so fixed to the dichroic prism 55 that the light incident end surface 56a faces the light exiting end surface 55c of the dichroic prism 55. That is, the angle converter 56 and the dichroic prism 55 are in contact with each other via an optical adhesive (not shown), and no air gap (air layer) is provided between the angle converter 56 and the dichroic prism 55. It is noted that the angle converter 56 may instead be so fixed to the dichroic prism 55 as to be in direct contact therewith, for example, via an arbitrary support member. In either case, it is desirable that no air gap is provided between the angle converter 56 and the dichroic prism 55. It is further desirable that the refractive index of the angle converter 56 is as close as possible to the refractive index of the dichroic prism 55.

The angle converter 56 may be a compound parabolic concentrator (CPC) in place of the tapered rod. In the case where the angle converter 56 is a CPC, the same effect provided in the case where the angle converter 56 is the tapered rod is provided.

The collimator lens 57 is provided on the light exiting side of the light exiting end surface 56b of the angle converter 56. The collimator lens 57 parallelizes the combined light LW having exited out of the angle converter 56. That is, the collimator lens 57 further increases the parallelism of the combined light LW, the angle distribution of which has been converted by the angle converter 56. The collimator lens 57 is formed of a convex lens. In a case where only the angle converter 56 provides sufficient parallelism of the combined light LW, the collimator lens 57 may not necessarily be provided.

An effect of the light source apparatus 2 having the configuration described above will be described below.

Since the divergence angle adjuster 52 is provided at the first end surface 51a of the light guiding rod 51, as described above, the laser light LB0 emitted from the first light source 61 travels through the divergence angle adjuster 52 and enters the light guiding rod 51 via the first end surface 51a. The divergence angle adjuster 52 is so set by appropriately designing the protruding/recessed structural element 59 that the divergence angle θ has a desired value. As a result, the angle of incidence α of the blue light LB1 incident on each of the side surfaces 51c1, 51c2, 51c3, and 51c4 of the light guiding rod 51 is greater than or equal to the critical angle. The blue light LB1 having entered the light guiding rod 51 therefore travels toward the second end surface 51b while repeatedly totally reflected off the side surfaces 51c1, 51c2, 51c3, and 51c4 of the light guiding rod 51.

The blue light LB1 having exited via the second end surface 51b of the light guiding rod 51 is then reflected off the reflection surface 54c of the prism. 54, so that the optical path of the blue light LB1 is deflected, and the reflected blue light LB1 enters the dichroic prism 55. A gap (air layer) is desirably provided between the prism 54 and the dichroic prism 55 so that the prism 54 and the dichroic prism 55 are not in direct contact with each other. Providing a gap between the prism 54 and the dichroic prism 55 prevents light incident on the interface between the prism 54 and the dichroic prism 55 at an angle of incidence smaller than the critical angle associated with the interface out of the light having traveled to the vicinity of the interface from leaking out of the prism 54 or the dichroic prism 55, whereby the light usage efficiency can be increased.

On the other hand, when the excitation light LE emitted from the second light source 62 enters the wavelength conversion rod 58, the excitation light LE excites the phosphor contained in the wavelength conversion rod 58, and the fluorescence LY is emitted from an arbitrary light emission point P1. The fluorescence LY travels omnidirectionally from the arbitrary light emission point P1, and the fluorescence LY traveling toward any of the side surfaces 58c1, 58c2, 58c3, and 58c4 travels toward the third end surface 58a or the fourth end surface 58b while being repeatedly totally reflected off the side surfaces 58c1, 58c2, 58c3, and 58c4. The fluorescence LY traveling toward the fourth end surface 58b enters the dichroic prism 55 via the fourth end surface 58b. On the other hand, the fluorescence LY traveling toward the third end surface 58a is reflected off the mirror 63 and then travels toward the fourth end surface 58b.

The blue light LB1 having entered the dichroic prism 55 is reflected off the dichroic mirror 551. On the other hand, the fluorescence LY having entered the dichroic prism 55 passes through the dichroic mirror 551. As a result, the blue light LB1 and the yellow fluorescence LY are combined with each other, and the white combined light LW exits via the light exiting end surface 55c of the dichroic prism 55. The combined light LW having exited out of the dichroic prism 55 is parallelized by the angle converter 56 and the collimator lens 57 and then emitted from the light source apparatus 2. The combined light LW emitted from the light source apparatus 2 (illumination light WL) travels toward the optical integration system 31, as shown in FIG. 1.

The light source apparatus 2 according to the present embodiment is configured as follows: the light guiding rod 51, out of which the blue light LB1 exits, and the wavelength conversion rod 58, out of which the yellow fluorescence LY exits, are so disposed that side surfaces thereof face each other; the light combiner 53 is disposed at the second end surface 51b of the light guiding rod 51 and the fourth end surface 58b of the wavelength conversion rod 58; the first light source 61 is so provided as to face the first end surface 51a of the light guiding rod 51; and the second light source 62 is so provided as to face the side surface 58c2 of the wavelength conversion rod 58. A compact light source apparatus capable of outputting white light can be thus achieved.

Since the light source apparatus 2 according to the present embodiment has the configuration in which the blue light LB1 emitted from the first light source 61 is guided by the light guiding rod 51d to the light combiner 53, the blue light can be efficiently provided in the simple configuration without a separately prepared phosphor light source capable of emitting blue light, for example, the combination of an ultraviolet LED and a blue phosphor.

In general, a laser light source excels an LED light source in that the former has a larger amount of light flux per unit area than the latter provided that the applied electric power is fixed. Laser light used as the blue light therefore increases the efficiency at which the blue light is used as compared with a case where LED light is used as the blue light.

Further, since the laser light source 611 emits light having a small diameter and a small divergence angle, the laser light LB0 can be reliably incident on the first end surface 51a of the light guiding rod 51 even in a case where the light guiding rod 51 has a small dimension B in the widthwise direction. Efficient laser light can therefore be effectively used.

If the light from the laser light source 611 is caused to enter the light guiding rod 51 via one side surface thereof, the angle of incidence of the light incident on the opposing side surface facing the side surface can be smaller than the critical angle associated with the opposing side surface, so that a large amount of incident light passes through the opposing side surface into the external space. The configuration in the present embodiment is therefore an example of a preferable configuration that allows the laser light to enter the light guiding rod 51 via the first end surface 51a thereof.

On the other hand, in the case of the second light source 62, the excitation light from the second light source 62 enters the wavelength conversion rod 58 and contributes to the fluorescence emission when the excitation light reaches the phosphor. Therefore, when the light is incident via a side surface, there is no concern of leakage of the light from the second light source 62 through another side surface unlike the case of the first light source 61. The side surface 58c2 of the wavelength conversion rod 58 can therefore be used to cause the light from the LED light sources, which each output light having a large divergence angle, to enter the wavelength conversion rod 58 by a sufficient amount. Further, since the area of a side surface is sufficiently greater than the area of an end surface, the number and arrangement of LED light sources can be designed with increased flexibility.

In the present embodiment, in which the blue light LB1 having exited out of the light guiding rod 51 and the yellow fluorescence LY having exited out of the wavelength conversion rod 58 are combined with each other into white light, adjusting the balance between the amount of blue light LB1 and the amount of yellow fluorescence LY can adjust the white balance of the white light. As a specific method for adjusting the white balance, for example, the light source apparatus 2 may be provided with sensors that detect the amounts of blue light LB1 and the fluorescence LY, and the electric power supplied to the first light source 61 and the second light source 62 may be adjusted as appropriate in accordance with the amount of deviation of each of the amounts of light detected by the sensors from a standard value. Further, as a method for adjusting the white balance in the design stage, the numbers of first light sources 61 and second light sources 62 may be adjusted, or the lengths and thicknesses of the light guiding rod 51 and the wavelength conversion rod 58 may be adjusted.

In the light source apparatus 2 according to the present embodiment, the angle converter 56, which is provided on the light exiting side of the dichroic prism 55, can parallelize the combined light LW having exited out of the dichroic prism 55. Further, the collimator lens 57, which is provided on the light exiting side of the angle converter 56, can further increase the parallelism of the combined light LW. The light use efficiency in an optical system on the downstream of the light source apparatus 2 can thus be increased.

A reflection film formed, for example, of a metal film may be provided in place of the gap (air layer) between the side surface 51c1 of the light guiding rod 51 and the side surface 58c1 of the wavelength conversion rod 58. In the case where a reflection film formed of a metal film is provided between the light guiding rod 51 and the wavelength conversion rod 58, however, optical loss occurs when the light propagating through the interior of each of the rods is reflected off the reflection film, resulting in a problem of an increase in the optical loss in accordance with an increase in the number of reflection actions at the reflection film for an increase in the illuminance uniformity of the light.

In contrast, in the light source apparatus 2 according to the present embodiment, the gap (air layer) provided between the light guiding rod 51 and the wavelength conversion rod 58 causes the reflection of the light at the side surfaces 51c1 and 58c1 of the rods 51 and 58 to be total reflection accompanied by no optical loss. The light use efficiency can therefore be increased.

The projector 1 according to the present embodiment, which includes the light source apparatus 2 described above, allows size reduction and excels in light use efficiency.

The divergence angle adjuster 52 of the light guiding rod 51 in the present embodiment may instead be configured as described below.

First Variation

Figure 3:
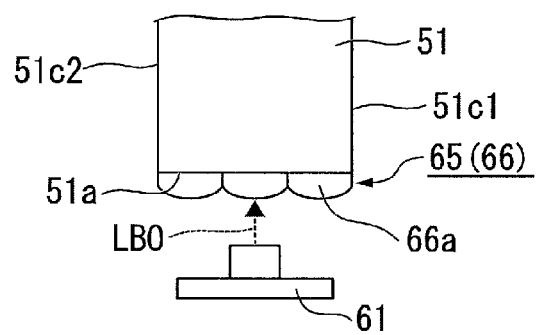
FIG. 3 is a side view of a divergence angle adjuster according to a first variation.

FIG. 3 is a side view of a divergence angle adjuster 65 according to a first variation. In FIG. 3, components common to those in FIG. 2 have the same reference characters and will not be described.

In a light source apparatus according to the first embodiment, the light guiding rod 51 includes the divergence angle adjuster 65 provided at the first end surface 51a, as shown in FIG. 3. The divergence angle adjuster 65 is formed of a lens structural element 66 including a plurality of lenses 66a. The lenses 66a have the same shape and dimensions, and the interval between the adjacent lenses 66a is fixed. The divergence angle adjuster 65 has a configuration in which the lens structural element 66 is formed directly at the first end surface 51a of the light guiding rod 51. That is, the divergence angle adjuster 65 is provided integrally with the light guiding rod 51.

Second Variation

Figure 4:
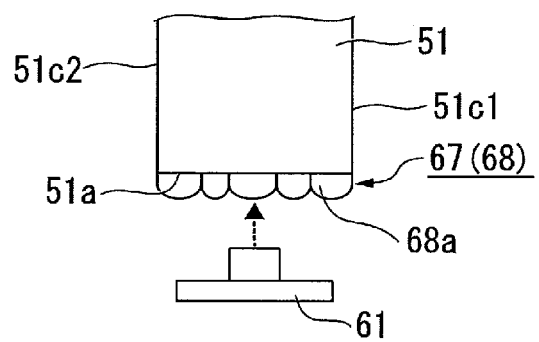
FIG. 4 is a side view of a divergence angle adjuster according to a second variation.

FIG. 4 is a side view of a divergence angle adjuster 67 according to a second variation. In FIG. 4, components common to those in FIG. 2 have the same reference characters and will not be described.

In a light source apparatus according to the second embodiment, the light guiding rod 51 includes the divergence angle adjuster 67 provided at the first end surface 51a, as shown in FIG. 4. The divergence angle adjuster 67 is formed of a lens structural element 68 including a plurality of lenses 68a. The lenses 68a have shape and dimensions different from one another, and the interval between the adjacent lenses 68a varies. The divergence angle adjuster 67 has a configuration in which the lens structural element 68 is formed directly at the first end surface 51a of the light guiding rod 51. That is, the divergence angle adjuster 67 is provided integrally with the light guiding rod 51.

Using the divergence angle adjuster 52 formed of the protruding/recessed structural element 59 in the first embodiment described above, the divergence angle adjuster 65 formed of the lens structural element 66 in the first variation described above, and the divergence angle adjuster 67 formed of the lens structural element 68 in the second variation described above allows an increase in the efficiency at which the laser light BL0 is used because the amount of backscattered laser light LB0 is small when the laser light LB0 enters the divergence angle adjusters 52, 65, and 67.

Third Variation

Figure 5:
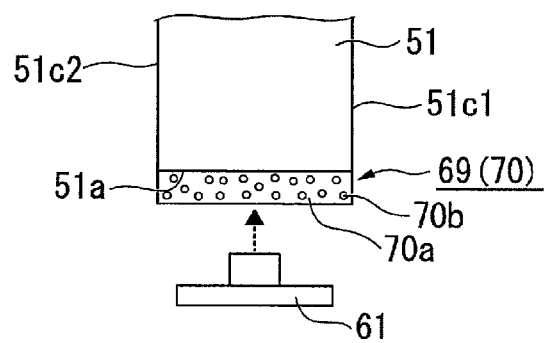
FIG. 5 is a side view of a divergence angle adjuster according to a third variation.

FIG. 5 is a side view of a divergence angle adjuster 69 according to a third variation. In FIG. 5, components common to those in FIG. 2 have the same reference characters and will not be described.

In a light source apparatus according to the third variation, the light guiding rod 51 includes the divergence angle adjuster 69 provided at the first end surface 51a, as shown in FIG. 5. The divergence angle adjuster 69 is formed of a filler dispersed layer 70. The filler dispersed layer 70 has a configuration in which a plurality of fillers 70b are dispersed in a base material 70a and the fillers 70b have a refractive index different from the refractive index of the base material 70a.

Employing the divergence angle adjuster 69 in the present variation eliminates the need for processing for forming protrusions/recesses or lenses at the first end surface 51a of the light guiding rod 51 and therefore allows the divergence angle adjuster 69 to be readily formed.

Second Embodiment

A second embodiment of the present disclosure will be described below with reference to FIG. 6.

A light source apparatus according to the second embodiment has the same basic configuration as that in the first embodiment, and the configuration of the divergence angle adjuster differs from that in the first embodiment. The entire configuration of the light source apparatus will therefore not be described.

Figure 6:
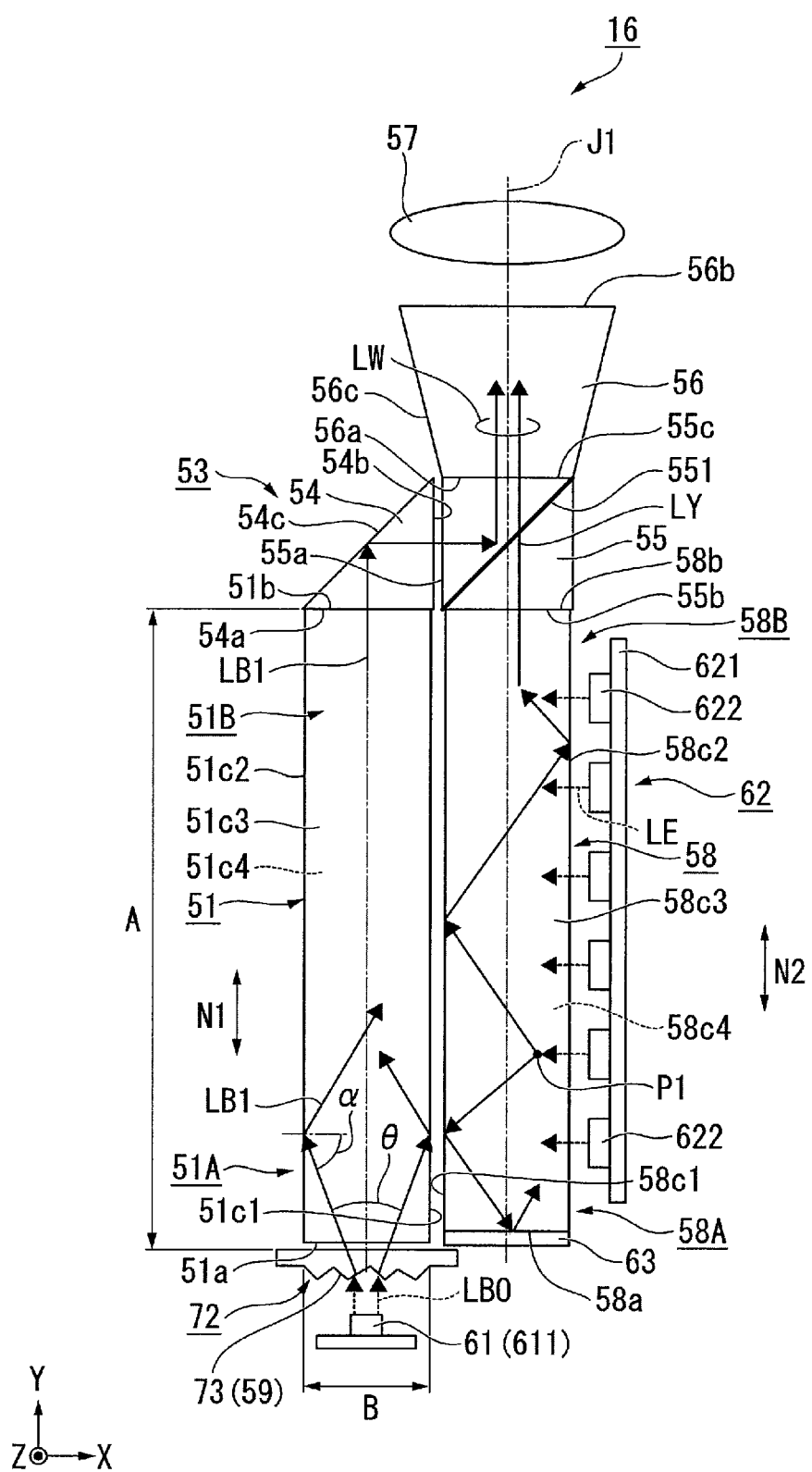
FIG. 6 is a side view of a light source apparatus according to a second embodiment.

FIG. 6 is a schematic configuration diagram of a light source apparatus 16 according to the second embodiment.

In FIG. 6, components common to those in FIG. 2 have the same reference characters and will not be described.

The light source apparatus 16 includes the light guiding rod 51 (light guide), a divergence angle adjusting member 72, the wavelength conversion rod 58 (wavelength converter), the first light source 61, the second light source 62, the light combiner 53, the angle converter 56, and the collimator lens 57, as shown in FIG. 6.

The divergence angle adjusting member 72 is provided between the first end surface 51a of the light guiding rod 51 and the first light source 61. The divergence angle adjusting member 72 includes a divergence angle adjuster 73, which adjusts the divergence angle of the laser light LB0 that enters the light guiding rod 51. The divergence angle adjuster 73 is formed of the protruding/recessed structural element 59 having a plurality of protrusions or recesses, as in the first embodiment. The protrusions or recesses each have, for example, a pyramidal shape or a conical shape. The plurality of protrusions or recesses may be arranged at random intervals and may have random heights, shapes, and other factors. The divergence angle adjusting member 72 may be so produced as to be larger than the first end surface 51a of the light guiding rod 51 so that part of the divergence angle adjusting member 72 extends off the first end surface 51a of the light guiding rod 51. Even in this case, the divergence angle adjuster 73 only needs to be provided in a region of the divergence angle adjusting member 72 that is the region corresponding to the first end surface 51a of the light guiding rod 51.

In the first embodiment, the divergence angle adjuster 52 is provided integrally with the light guiding rod 51, whereas in the present embodiment, the divergence angle adjusting member 72 is provided as a member separate from the light guiding rod 51. The divergence angle adjusting member 72 may be so fixed to the light guiding rod 51 as to be in intimate contact therewith, for example, by using a fixture, such as an optical adhesive, or may be so held as to be separate from the light guiding rod 51 by using an arbitrary support member.

The other configurations of the light source apparatus 16 are the same as those in the first embodiment.

The present embodiment also provides the same effect as that provided by the first embodiment, that is, a compact, high-efficiency light source apparatus 16 is achieved.

Further, in the present embodiment, in which the divergence angle adjusting member 72 is formed of a member separate from the light guiding rod 51, the divergence angle adjusting member 72 can be produced separately from the light guiding rod 51 and then attached or otherwise fixed to the light guiding rod 51. The light source apparatus 16 can thus be manufactured with good productivity.

Third Embodiment

A third embodiment of the present disclosure will be described below with reference to FIG. 7.

A light source apparatus according to the third embodiment has the same basic configuration as that in the first embodiment, and the position of the first light source apparatus and the configuration of the divergence angle adjuster differ from those in the first embodiment. The entire configuration of the light source apparatus will therefore not be described.

Figure 7:
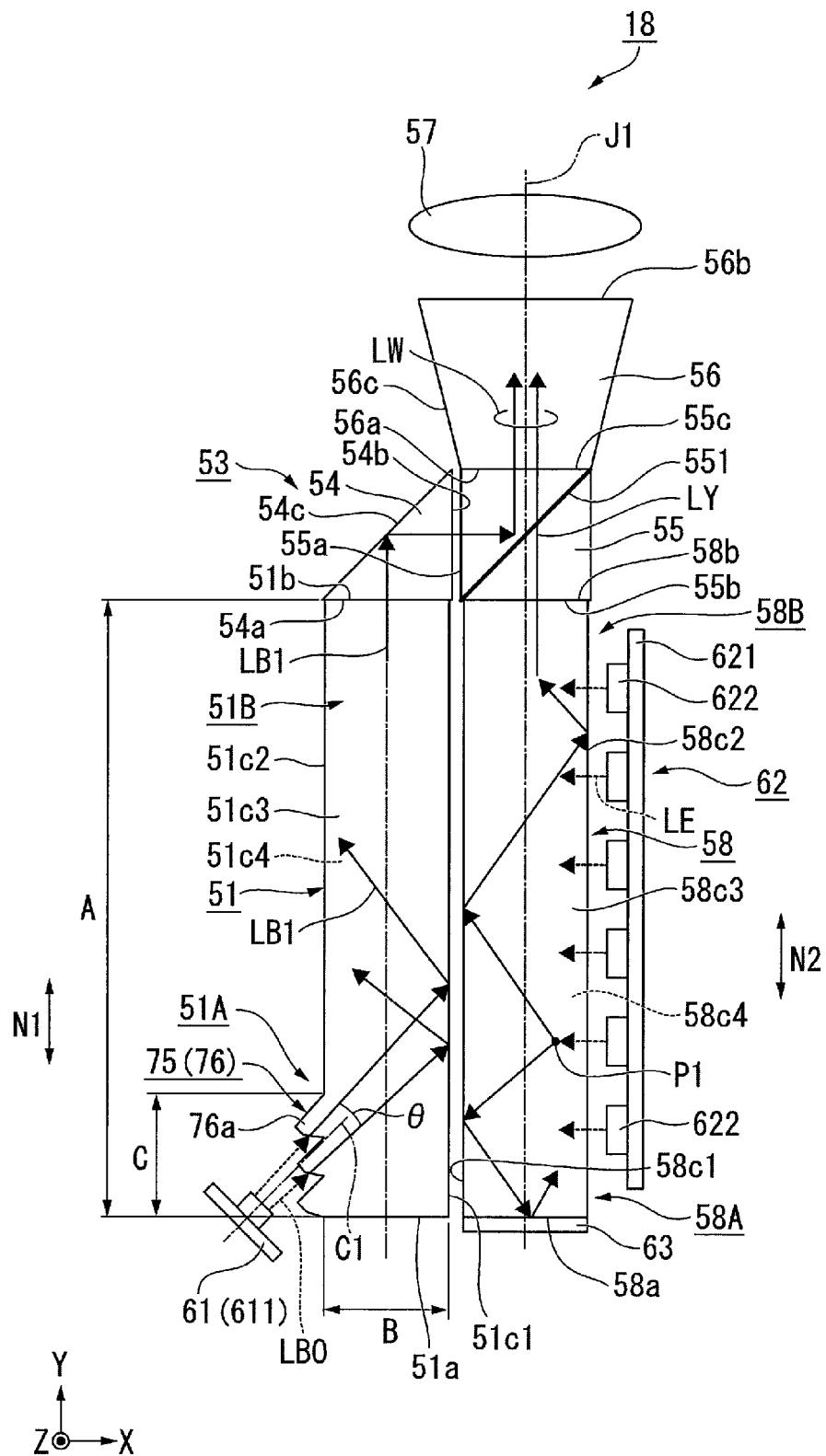
FIG. 7 is a side view of a light source apparatus according to a third embodiment.

FIG. 7 is a schematic configuration diagram of a light source apparatus 18 according to the third embodiment.

In FIG. 7, components common to those in FIG. 2 have the same reference characters and will not be described.

The light source apparatus 18 includes the light guiding rod 51 (light guide), the wavelength conversion rod 58 (wavelength converter), the first light source 61, the second light source 62, the light combiner 53, the angle converter 56, and the collimator lens 57, as shown in FIG. 7.

The light guiding rod 51 includes a divergence angle adjuster 75 provided at the side surface 51c2 of the first end section 51A. The divergence angle adjuster 75 is formed of a prism structural element 76 including a plurality of prisms 76a. The individual prisms 76a each have, for example, a scalene quadrangle. The divergence angle adjuster 75 has a configuration in which the prism structural element 76 is formed directly at the side surface 51c2 of the light guiding rod 51. That is, the divergence angle adjuster 75 is provided integrally with the light guiding rod 51. Out of all the side surfaces 51c1, 51c2, 51c3, and 51c4 of the light guiding rod 51, the regions excluding the region where the divergence angle adjuster 75 is formed form smooth surfaces.

The divergence angle adjuster 75 is provided in the range from the first end surface 51a of the light guiding rod 51 to the position separate therefrom by a dimension C. In the present embodiment, the dimension C is substantially equal to the dimension B. In other words, the divergence angle adjuster 75 is provided in the range from the first end surface 51a of the light guiding rod 51 to the position separate therefrom by a distance substantially equal to the length of one edge of the first end section 51A. Since the dimension A is about ten to several-dozen times the dimension B, as described in the first embodiment, the dimension C is about one-several-tenth to one-tenth the dimension A. The divergence angle adjuster 75 is therefore desirably provided in the range from the first end surface 51a of the light guiding rod 51 to the position separate therefrom by about one-tenth the length of the entire rod. The first end section 51A in the light source apparatus 18 according to the present embodiment means a portion of the rod that is the portion within the range corresponding to about one-tenth the length of the entire rod.

The first light source 61 is so disposed laterally next to the light guiding rod 51 that a center axis C1 of the laser light LB0 emitted from the first light source 61 obliquely intersects the side surface 51c2. The first light source 61 emits the laser light LB0 toward the side surface 51c2 of the light guiding rod 51.

The other configurations of the light source apparatus 18 are the same as those in the first embodiment.

In the light source apparatus 18 according to the present embodiment, in which the divergence angle adjuster 75 is provided at the side surface 51c2 of the light guiding rod 51, the divergence angle of the laser light LB0 increases from substantially 0° immediately after the laser light LB0 is emitted from the first light source 61 to a predetermined angle θ. In this case, the divergence angle θ can be adjusted by optimizing the interval between the prisms 76a of the prism structural element 76 and the height, shape, and other factors of the prisms 76a. As a result, the blue light LB1 propagates through the interior of the light guiding rod 51 while repeatedly reflected off the side surfaces 51c1, 51c2, 51c3, and 51c4, whereby the illuminance homogenizing effect can be enhanced.

The present embodiment also provides the same effect as that provided by the first embodiment, that is, the compact, high-efficiency light source apparatus 18 is achieved.

Further, since the divergence angle adjuster 75 is provided in a position on the light guiding rod 51 that is the position closest to the first end surface 51a, a length of the light guiding rod 51 that is the length that contributes to the propagation of the blue light LB1 is sufficiently ensured, whereby the illuminance homogenizing effect is provided. Also in the present embodiment, a divergence angle adjuster separate from the light guiding rod 51 may be disposed at a side surface of the first end section 51A of the light guiding rod 51, and the laser light LB0 emitted from the first light source 61 may be caused to enter the first end section 51A via the side surface thereof, as in the second embodiment.

Fourth Embodiment

A fourth embodiment of the present disclosure will be described below with reference to FIG. 8.

The first embodiment has been described with reference to a liquid crystal projector, whereas the fourth embodiment will be described with reference to a projector including a micromirror-type light modulator.

Figure 8:
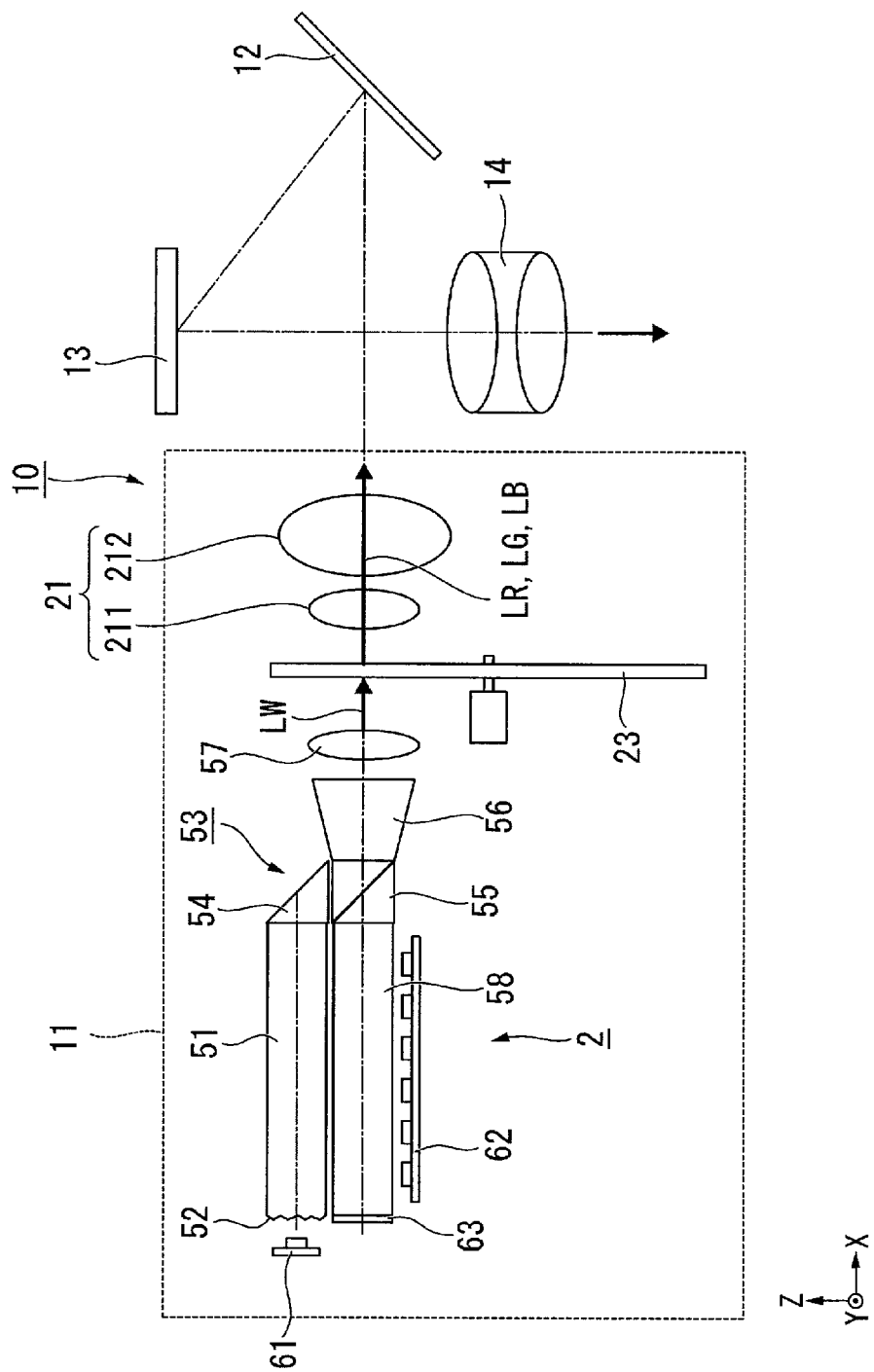
FIG. 8 is a schematic configuration diagram of a projector according to a fourth embodiment.

A projector 10 according to the fourth embodiment includes an illuminator 11, a light guide system 12, a micromirror-type light modulator 13, and a projection optical apparatus 14, as shown in FIG. 8. The illuminator 11 includes the light source apparatus 2, a color wheel 23, and a pickup system 21.

In the fourth embodiment, the light source apparatus 2 according to the first embodiment is used as the light source apparatus 2 of the projector 10. It is, however, noted that the light source apparatus 16 according to the second embodiment or the light source apparatus 18 according to the third embodiment may be used as the light source apparatus 2 of the projector 10. In the fourth embodiment, the light source apparatus 2 will not therefore be described.

The color wheel 23 has a configuration in which three color filters, red, green, and blue color filters, are provided on a rotatable substrate along the circumferential direction around the axis of rotation. When the white light LW emitted from the light source apparatus 2 passes through the color wheel 23 rotating at high speed, the red light LR, the green light LG, and the blue light LB exit out of the color wheel 23 in a time division manner.

In the present embodiment, in which the configuration of the light source apparatus 2 is the same as that in the first embodiment, the red light LR, the green light LG, and the blue light LB may be generated in a time division manner in a form in which the first light source 61 and the second light source 62 alternately output light in a time division manner, the color wheel 23 temporally divides the yellow light that exits out of the wavelength conversion rod 58 when the second light source 62 emits light into the red light LR and the green light LG, and the blue light LB that exits out of the light guiding rod 51 when the first light source 61 emits light exits in a period different from the period when the red light LR and the green light LG exit.

Instead, the red light LR, the green light LG, and the blue light LB may be generated in a time division manner in a form in which the first light source 61 and the second light source 62 output light simultaneously and the color wheel 23 temporally divides the white light LW emitted from the light source apparatus 2.

In the case where the former method is employed, the yellow light and the blue light do not simultaneously enter the light combiner 53 of the light source apparatus 2. Even in this case, the light combiner 53 functions as an element that combines the yellow light and the blue light with each other because the yellow light and the blue light that switch from one to the other at a speed unrecognizable by human eyes exit in the same direction.

The pickup system 21 is formed of a first lens 211 and a second lens 212. The first lens 211 and the second lens 212 are each formed of a convex lens. The red light LR, the green light LG, and the blue light LB having exited out of the color wheel are transferred by the pickup system 21 to the light guide system 12.

The light guide system 12 is formed of a reflection mirror. The light guide system 12 reflects the red light LR, the green light LG, and the blue light LB emitted from the light source apparatus 2 and causes the reflected color light to be incident on the light modulator 13 in a time division manner.

The micromirror-type light modulator 13 is, for example, a digital micromirror device (DMD). A DMD has a configuration in which a plurality of micromirrors are arranged in a matrix. A DMD switches at high speed the direction in which the light incident thereon is reflected off the DMD between the direction in which the reflected light enters the projection optical apparatus 14 and the direction in which the reflected light does not enter the projection optical apparatus 14 by switching the direction in which the plurality of micromirrors incline. The light modulator 13 thus sequentially modulates the red light LR, the green light LG, and the blue light LB emitted from the light source apparatus 2 to produce a green image, a red image, and a blue image.

The projection optical apparatus 14 projects the green image, the red image, and the blue image on a screen. The projection optical apparatus 14 is formed, for example, of a plurality of projection lenses.

The projector 10 according to the present embodiment, which includes the light source apparatus 2 according to the first embodiment, allows size reduction and excels in light use efficiency.

The technical range of the present disclosure is not limited to the embodiments described above, and a variety of changes can be made thereto to the extent that the changes do not depart from the substance of the present disclosure.

For example, the above-mentioned first embodiment has been described with reference to the case where the wavelength conversion rod contains a phosphor that emits yellow fluorescence. The wavelength conversion rod may instead contain two types of phosphor formed of a phosphor that emits green fluorescence and a phosphor that emits red fluorescence. In this case, the two types of phosphor may be uniformly mixed with each other in the wavelength conversion rod or may be individually present in separate regions of the wavelength conversion rod.

In the embodiments described above, the light source apparatus that emits white light has been presented by way of example, and the present disclosure is also applicable to a light source apparatus that emits color light other than white light. For example, a light source apparatus may include a light guiding rod out of which green light exits and a wavelength conversion rod out of which red light exits and may output yellow light. Also in this case, the present disclosure allows a compact, high-efficiency light source apparatus that emits yellow light to be achieved.

In the embodiments described above, the configuration example in which a prism and a dichroic prism are used as the light combiner has been presented, and another optical member capable of the light combination may also be used. For example, a reflection mirror may be used in place of the prism. Further, a scatterer having a light scattering structure provided therein may be used in place of the dichroic prism. Examples of the scatterer may include glass containing scattering particles and an optical member containing an anisotropic scattering layer. In the case where a scatterer is used, part of the blue light and part of the yellow light can be scattered in the same direction for the light combination although the light use efficiency decreases to some extent.

The shape, the number, the arrangement, the material, and other specific configurations of the components that form the light source apparatuses are not limited to those in the embodiments described above and can be changed as appropriate.

The above-mentioned first embodiment has been described with reference to the case where the present disclosure is applied to a transmissive liquid crystal projector, and the present disclosure is also applicable to a reflective liquid crystal projector. The term "transmissive" used herein means that a liquid crystal light valve, including a liquid crystal panel or any other component, transmits light. The term "reflective" means that the liquid crystal light valve reflects light.

The above-mentioned first embodiment has been described with reference to a projector including three liquid crystal panels. The present disclosure is also applicable to a projector using only one liquid crystal light valve and a projector using four or more liquid crystal light valves.

The above embodiments have been described with reference to the case where the light source apparatus according to each of the embodiments of the present disclosure is incorporated in a projector, but not necessarily. The illuminator according to each of the embodiments of the present disclosure may also be used as a lighting apparatus, a headlight of an automobile, and other components.

What is claimed is:

1. A light source apparatus comprising:
   a first light source that emits first light;
   a second light source that emits second light;
   a light guide that causes the first light emitted from the first light source to propagate;
   a wavelength converter containing a phosphor that emits fluorescence when excited with the second light emitted from the second light source; and
   a light combiner that combines the first light having exited out of the light guide with the fluorescence having exited out of the wavelength converter,
   wherein the light guide and the wavelength converter are disposed side by side,
   the light guide has a first end section and a second end section,
   the wavelength converter has a third end section and a fourth end section, the first light enters the light guide via the first end section thereof,
   a lengthwise direction of the light guide is a direction in which the first end section and the second end section face each other,
   a lengthwise direction of the wavelength converter is a direction in which the third end section and the fourth end section face each other,
   the light guide and the wavelength converter are so disposed as to be adjacent to each other that the lengthwise direction of the light guide is parallel to the lengthwise direction of the wavelength converter,
   the first light, after being emitted from the first light source, enters the light guide and reaches the light combiner without passing through a phosphor, and
   all light emitting from the wavelength converter goes to the light combiner without entering the light guide.

2. The light source apparatus according to claim 1, wherein the first light source is a laser light source, and the second light source is a light emitting diode light source.

3. The light source apparatus according to claim 2, wherein the first light is blue laser light emitted from the laser light source,
   the second light is excitation light emitted from the light emitting diode light source,
   the fluorescence is yellow fluorescence, and
   the light combiner combines the blue laser light with the yellow fluorescence and emits resultant white light.

4. The light source apparatus according to claim 1, wherein the light guide is provided at the first end section and includes a divergence angle adjuster that adjusts a divergence angle of the first light that enters the light guide.

5. The light source apparatus according to claim 4, wherein the divergence angle adjuster is formed of any of a protruding/recessed structural element, a lens structural element, a prism structural element, and a filler dispersed layer.

6. The light source apparatus according to claim 1, further comprising a divergence angle adjusting member that is provided between the first end section and the first light source and includes a divergence angle adjuster that adjusts a divergence angle of the first light that enters the light guide.

7. The light source apparatus according to claim 1, wherein the first light source emits the first light toward an end surface of the light guide.

8. The light source apparatus according to claim 1, wherein the first light source emits the first light toward a side surface of the first end section of the light guide.

9. The light source apparatus according to claim 1, wherein the light combiner is disposed in a position where the light combiner faces the second end section and the fourth end section.

10. The light source apparatus according to claim 9, wherein the light combiner includes a prism that faces the second end section and a dichroic prism that faces the fourth end section.

11. A light source apparatus comprising:
a laser light source that emits blue laser light;
a light emitting diode light source that emits excitation light;
a light guide that causes the blue laser light emitted from the laser light source to propagate;
a wavelength converter that the excitation light emitted from the light emitting diode light source enters and contains a phosphor that emits yellow fluorescence when excited with the excitation light having entered the wavelength converter; and
a light combiner that combines the blue laser light having exited out of the light guide with the yellow fluorescence having exited out of the wavelength converter and emits resultant white light,
wherein the light guide and the wavelength converter are disposed side by side,
the light guide and the wavelength converter are juxtaposed in a direction perpendicular to a direction in which the light guide elongates, and a side surface of the light guide faces and opposes a side surface of the wavelength converter,
the blue laser light, after being emitted from the laser light source, enters the light guide and reaches the light combiner without passing through a phosphor, and
all light emitting from the wavelength converter goes to the light combiner without entering the light guide.

12. A projector comprising:
the light source apparatus according to claim 1;
a light modulator that modulates light from the light source apparatus in accordance with image information; and
a projection optical apparatus that projects the light modulated by the light modulator.

13. A light source apparatus comprising:
a first light source that emits first light;
a second light source that emits second light;
a light guide that causes the first light emitted from the first light source to propagate;
a wavelength converter containing a phosphor that emits fluorescence when excited with the second light emitted from the second light source; and
a light combiner that combines the first light having exited out of the light guide with the fluorescence having exited out of the wavelength converter,
wherein the light guide and the wavelength converter are disposed side by side,
the light guide has a first end section and a second end section,
the wavelength converter has a third end section and a fourth end section,
the first light enters the light guide via the first end section thereof,
a lengthwise direction of the light guide is a direction in which the first end section and the second end section face each other,
a lengthwise direction of the wavelength converter is a direction in which the third end section and the fourth end section face each other,
the light guide and the wavelength converter are so disposed as to be adjacent to each other that the lengthwise direction of the light guide is parallel to the lengthwise direction of the wavelength converter,
the light guide and the wavelength converter are juxtaposed in a direction perpendicular to a direction in which the light guide elongates, and a side surface of the light guide faces and opposes a side surface of the wavelength converter,
the first light, after being emitted from the first light source, enters the light guide and reaches the light combiner without passing through a phosphor, and
all light emitting from the wavelength converter goes to the light combiner without entering the light guide.

14. A light source apparatus comprising:
a laser light source that emits blue laser light;
a light emitting diode light source that emits excitation light;
a light guide that causes the blue laser light emitted from the laser light source to propagate;
a wavelength converter that the excitation light emitted from the light emitting diode light source enters and contains a phosphor that emits yellow fluorescence when excited with the excitation light having entered the wavelength converter; and
a light combiner that combines the blue laser light having exited out of the light guide with the yellow fluorescence having exited out of the wavelength converter and emits resultant white light,
wherein the light guide and the wavelength converter are disposed side by side,
the blue laser light, after being emitted from the laser light source, enters the light guide and reaches the light combiner without passing through a phosphor, and
all light emitting from the wavelength converter goes to the light combiner without entering the light guide.

* * * * *